(12) United States Patent
Kuscher et al.

(10) Patent No.: US 9,389,873 B2
(45) Date of Patent: Jul. 12, 2016

(54) KIOSK APPLICATION MODE FOR OPERATING SYSTEM

(71) Applicant: GOOGLE INC., Mountain View, CA (US)

(72) Inventors: Alexander Friedrich Kuscher, San Francisco, CA (US); Rajen Sheth, Mountain View, CA (US); Vidya Nagarajan, Palo Alto, CA (US); Caesar Sengupta, Sunnyvale, CA (US); Zelidrag Hornung, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 13/892,673

(22) Filed: May 13, 2013

(65) Prior Publication Data

US 2014/0337611 A1   Nov. 13, 2014

(51) Int. Cl.
| | |
|---|---|
| *G06F 9/44* | (2006.01) |
| *G06F 9/445* | (2006.01) |
| *G06F 21/12* | (2013.01) |
| *G06F 21/57* | (2013.01) |
| *G06F 21/62* | (2013.01) |
| *H04N 7/14* | (2006.01) |

(52) U.S. Cl.
CPC .............. *G06F 9/4401* (2013.01); *G06F 8/65* (2013.01); *G06F 21/121* (2013.01); *G06F 21/57* (2013.01); *G06F 21/629* (2013.01); *G06F 2221/2105* (2013.01); *G06F 2221/2149* (2013.01); *H04N 7/141* (2013.01)

(58) Field of Classification Search
None
See application file for complete search history.

(56) References Cited

U.S. PATENT DOCUMENTS

| | | | | |
|---|---|---|---|---|
| 5,715,386 | A  * | 2/1998 | Fulton et al. | 714/38.12 |
| 6,195,694 | B1 * | 2/2001 | Chen | G07F 17/0014 |
| | | | | 709/203 |
| 2003/0016243 | A1 * | 1/2003 | Korala | 345/741 |
| 2003/0061271 | A1 | 3/2003 | Pittarelli | |
| 2006/0085086 | A1 | 4/2006 | Phillips et al. | |
| 2006/0130045 | A1 * | 6/2006 | Wesley et al. | 717/168 |
| 2008/0010375 | A1 | 1/2008 | Coleman et al. | |
| 2008/0228773 | A1 | 9/2008 | Stewart et al. | |
| 2013/0291079 | A1 * | 10/2013 | Lowe et al. | 726/7 |
| 2014/0043423 | A1 * | 2/2014 | Lindberg | 348/14.01 |

FOREIGN PATENT DOCUMENTS

WO    2014/186205 A1   11/2014

OTHER PUBLICATIONS

"WebConverger The #1 Opensource Web Kiosk", Webconverger. com, May 2013, 2 pages.

(Continued)

*Primary Examiner* — Paul Yanchus, III
(74) *Attorney, Agent, or Firm* — Brake Hughes Bellermann LLP

(57) ABSTRACT

A method includes transforming a mode of a computer from an operating system mode to a kiosk mode, wherein the kiosk mode provides a user interface for one web application, and wherein the kiosk mode prevents access to any other application or the operating system of the computer. The computer automatically updates the web application via a network while the computer is operating in kiosk mode, and automatically updates an operating system of the computer via the network while the computer is operating in kiosk mode. The computer automatically re-launches the web application in response to detecting an interrupted status of the web application while the computer is operating in kiosk mode.

20 Claims, 8 Drawing Sheets

(56) References Cited

OTHER PUBLICATIONS

Chaturvedi, "Issue 9744005: Modify the Login UI for Demo Mode (Closed)", Chromium Code Reviews, Apr. 2012, 1 page.
Chhatani, "Google Reveals Kiosk-Centric Chrome OS Update", May 2013, 3 pages.
Lutz, "Google Readies Chrome OS for All Corners at the Kiosk", Google Enterprise Blog, Apr. 30, 2013, 9 pages.
Mims, "How a Leveraged Buyout Could Actually Turn Dell Into the Tech Success Story of the Decade", QZ.com, Jan. 15, 2013, 5 pages.
Nagarajan, "Chromebook Kiosks for Customers and Employees", Official Google Enterprise Blog, Apr. 30, 2013, 2 pages.
Warren, "Windows 8.1 'Kiosk Mode' discovered in newly leaked build", Microsoft, Apr. 20, 2013, 3 pages.
International Search Report and Written Opinion for PCT Patent Application No. PCT/US2014/037281, mailed on Sep. 30, 2014, 12 pages.

\* cited by examiner

```
{
  "name": "My Kiosk Chrome App",
  "version": "1",
  "manifest_version": 2,
  ...
  "Kiosk_enabled": true
}
```

KIOSK APPLICATION MODE FOR OPERATING SYSTEM

TECHNICAL FIELD

This disclosure generally relates a kiosk application mode for an operating system of a computer.

BACKGROUND

Developers want to develop systems that are very specialized. Examples of specialized systems include are airline kiosks, metro ticket stations, or even snack machines. Other examples include ambient displays, home automation, or single-purpose applications devices. For example, an application developer for a game may want to produce a customized game machine.

Developers may use a custom Linux build, some mobile operating system (OS), or even write their entire OS themselves. Those solutions are expensive, not scalable, and may prove to be a huge undertaking especially for smaller developers.

SUMMARY

A system includes a device that provides a kiosk mode that runs a single application at a time and prevents a user from accessing an operating system or other application such as a web browser. The device may automatically update both the operating system and the application. A management console may allow an administrator to configure various kiosks from a remote location.

In one general aspect, a method includes transforming a mode of a computer from an operating system mode to a kiosk mode, wherein the kiosk mode provides a user interface for one web application, and wherein the kiosk mode prevents access to any other application or the operating system of the computer. The method includes automatically updating the web application via a network while the computer is operating in kiosk mode and automatically updating an operating system of the computer via the network while the computer is operating in kiosk mode. The method also includes automatically re-launching, via the computer, the web application in response to detecting an interrupted status of the web application while the computer is operating in kiosk mode.

Other implementations of this aspect include corresponding systems, apparatus, and computer programs, configured to perform the actions of the methods, encoded on computer storage devices.

In another general aspect, a system includes a camera hardware device that includes a microprocessor that executes an operating system and executes instructions to, in response to sending input from the camera hardware device to a monitor, automatically launch a network video communication session with another device, using the camera hardware device and the monitor, wherein the network video communication session operates in a kiosk mode. Other implementations of this aspect include corresponding methods, apparatus, and computer programs, configured to perform the actions of the methods, encoded on computer storage devices.

In yet another aspect, a method includes configuring, via an enterprise policy control panel of a first computer, an operating system mode of a second computer to a kiosk mode, wherein the kiosk mode provides a user interface for one web application, and wherein the kiosk mode prevents access to any other application or the operating system of the computer. The method includes automatically updating, by the second computer, the web application via a network while the second computer is operating in kiosk mode and automatically updating, by the second computer, an operating system of the second computer via the network while the second computer is operating in kiosk mode. The method includes automatically re-launching, via the second computer, the web application in response to detecting an interrupted status of the web application while the second computer is operating in kiosk mode.

Other implementations of this aspect include corresponding systems, apparatus, and computer programs, configured to perform the actions of the methods, encoded on computer storage devices.

One or more of the implementations of the subject matter described herein may provide one or more of the following advantages. Systems can be automatically updated. Systems are resilient and if an application operating in a kiosk mode crashes, the system (e.g., via the operating system) may automatically re-launch itself into the right place (e.g., to a state before it crashed). The operating system may monitor the state of the application and automatically push updates to any kiosk.

The details of one or more implementations are set forth in the accompanying drawings and the description below. Other features will be apparent from the description and drawings, and from the claims.

BRIEF DESCRIPTION OF THE DRAWINGS

FIG. 5 is an example manifest file that can be used to provide a kiosk mode.

Like reference symbols in the various drawings indicate like elements.

DETAILED DESCRIPTION

Figure 1A:
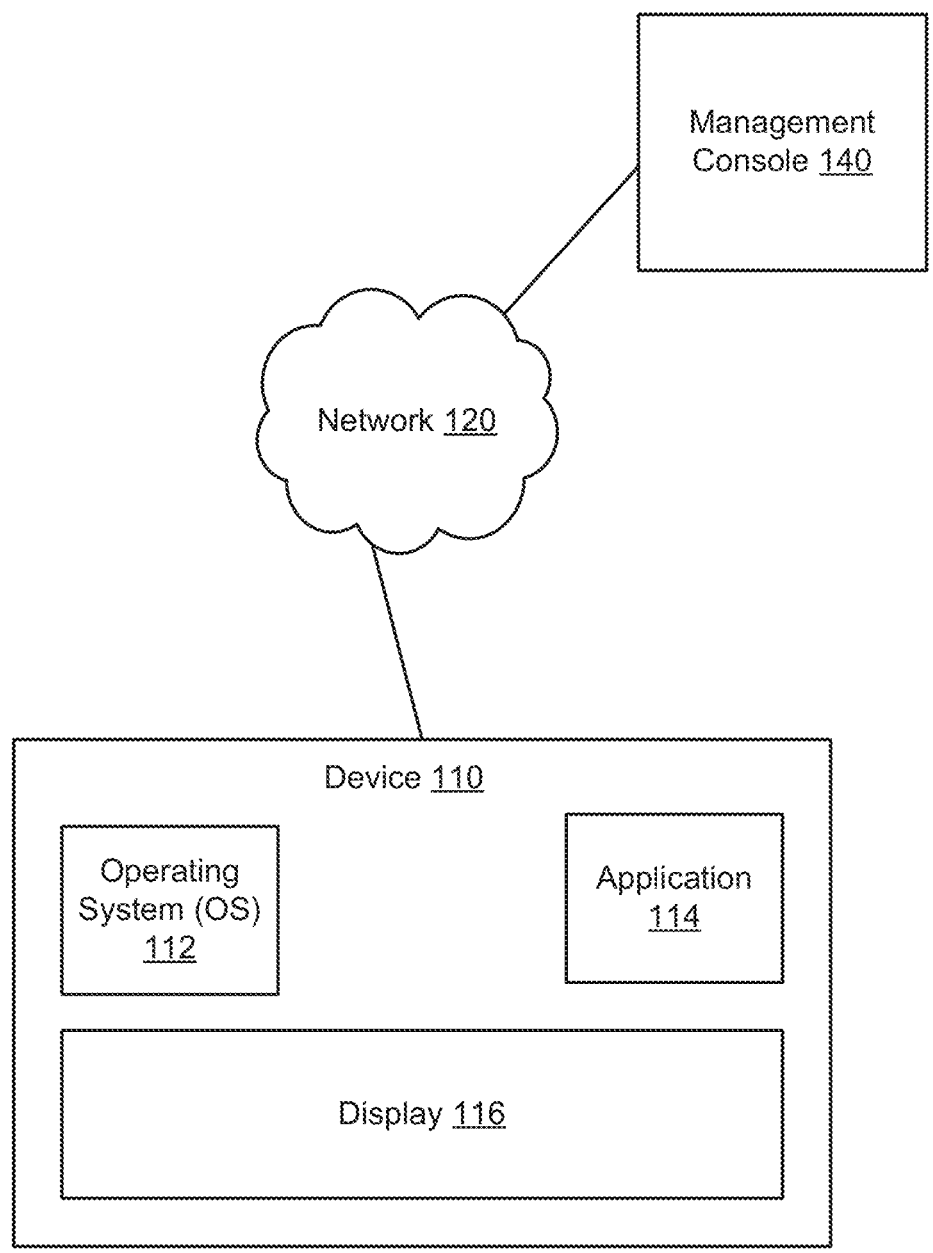
FIG. 1A is a block diagram of a system that can be used to provide a kiosk mode.

FIG. 1A is a block diagram of a system that can be used to provide a kiosk mode. System 100 may include at least one device 110 and at least one management console 140, which are interconnected through at least one network 120. The device 110 may be a computer, a smart phone, a laptop, or a similar device that may execute a user interface, download and execute software applications, and communicate with a network 120. In some implementations, as described in more detail below, the device may include a camera/microphone dongle with an input/output port. The device 110 includes an operating system 112, and may include an application 114. The application may be a packaged application or a web application, and may be downloaded from a web or digital store.

In this context, a "web application" may be an application that is configured to execute a single task or multiple tasks for a user. In such an implementation, the web application may be configured to be executed or interpreted by a web browser or may be directly operating by an operating system in a kiosk mode. Thus, web applications can be programmed with web technologies and run with a dedicated user interface, and typically provide functionality and an experience that is more rich and interactive than a standalone website but are less cumbersome and monolithic than a desktop application. Examples of web applications include games, photo editors, and video players that are run inside the browser. A web application may include a manifest file including metadata about the web application (such as a fields for a name, description, version, URLs that the web application uses, icons, permissions, and other data), and one or more web pages or user interface elements.

Throughout this document, a web application or an installed application may refer to a number of different types of applications. Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Web applications generally run standalone, like any regular website.

In some implementations, various applications are coded only with web technologies, such as HTML, CSS, JAVASCRIPT, DART, NaCl, etc., and may operate like native applications without the use of the browser. These applications may have a similar structure as a web application.

In some implementations, the device 110 may include a display screen 116. In some implementations, the device 110 may not include a display screen and instead may include other features, such as a camera or microphone and an input/output port or cable with HDMI or USB connections.

Network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

The components illustrated in association with device 110 are merely for illustration, as other components may be included. Various alternative and additional examples of devices are described in more detail below.

The management console 140 may be a computing device with a user interface that allows for a control panel to control various features of computers operating in an enterprise system, which may, in some implementations, include device 110. In such implementations, an administrator or other user may control, for example, which application is launched when the device is in a kiosk mode, which applications or websites a user may or may not access, timed logout sessions, input/output access for a device, a startup or login screen, and other features.

The device 110 may run a basic mode or a kiosk mode. The basic mode may include any kind of operating system features, applications such as web browsers, workstation programs, email, etc. The kiosk mode may be executed in a consumer mode or an enterprise mode. In a consumer mode, a user may obtain an application from an online application store. The application may be developed using web technologies and may include a unique (e.g., 32-bit) identification number and a kiosk mode flag in a manifest file. The user may set the application identifier to be the kiosk application, via a user interface. In the background, the operating system may then download the application, restart the device 110, determining that it is set to execute in kiosk mode and determining that an application exists, and install the application. The device 110 may launch a special operating session that executes that application, for example without requiring any login or startup screen, so that the application operates immediately upon launching the device 110 as a full screen user interface with the startup screen of the application. In some implementations, the user may at any time disable the kiosk mode, to switch back to the basic mode, using a set of keyboard termination credentials.

In various implementations, the user may at any time switch the application for the kiosk mode to a different application, for example by entering another application identifier as the application for the kiosk mode, for example from a control panel. In such a way, the user may switch a single device 110 from a video conferencing kiosk, back to a regular laptop, and then to a personal assistant kiosk, and then to a customized ordering system for a business, without installation of additional hardware or special configurations for each kiosk mode.

In the enterprise mode, an administrator may create an enterprise policy and manage one or more devices including device 110, for example as described in more detail below with respect to FIG. 1B. In those implementations, the devices may be configured to accept control from a management console. In such an implementation, a user of the device 110 could not switch out of the kiosk mode (enterprise mode) if the administrator disallowed switching at a device level. In those implementations, the administrator may utilize an enterprise policy management panel to setup a kiosk mode and control various devices as kiosk devices to run a specific application in kiosk mode.

In some implementations, various devices may be preconfigured as customized devices that run in kiosk mode at startup. For example, a device may be a customized video frame that automatically boots into a video conferencing user interface and immediately allows a user to video call anyone in the world, requiring no setup from a user.

It will be appreciated that any number of alternative or additional networks, servers, services, mobile devices, or devices may be included in system 100. The use of one device 110 and one management console 140 is merely for illustration.

One or more of the implementations of the subject matter described herein may provide one or more of the following advantages. The disclosed methods and systems allow a user to turn any operating system machine into a highly customized and branded single application experience for users. Examples include airline kiosks, coffee shop owners showing their menu or building an ordering process application, library catalogs, a flower shop that wants a digital catalog application, a mid-size company that wants to take fifteen old LCDs, plug a unit in and turn them into quick video conference units, with almost no setup for any of those. Such a system may use packaged applications or any website and set a device to display only the packaged application, web application, or website, which allows for immediate updates for an application, for example using web technologies. Moreover, both the OS and the kiosk mode are automatically updated without administrative or user interaction, and in some cases, without needing to reboot a device. A multi-application consumer kiosk mode may enable a highly targeted multi-application device with effectively no OS. Users/vendors can decide to install three kiosk apps (video conference application, personal assistant application, voice search application) and create uniquely customized devices for use cases (kitchen computer, ambient display, entertainment display, home automation control, etc.). A video conference frame may become a customized device (e.g. a single display slate) that boots into a video conference user interface and immediately allows a user to video call anybody in the world via a video conferencing application, requiring no setup. A kiosk camera may include a camera/microphone dongle that includes a tiny computer inside the camera housing running an OS. If plugged in via HDMI and/or USB into any monitor, that monitor is transformed into a personal video conference unit that auto-updates all the time without setup or hassles.

Figure 1B:
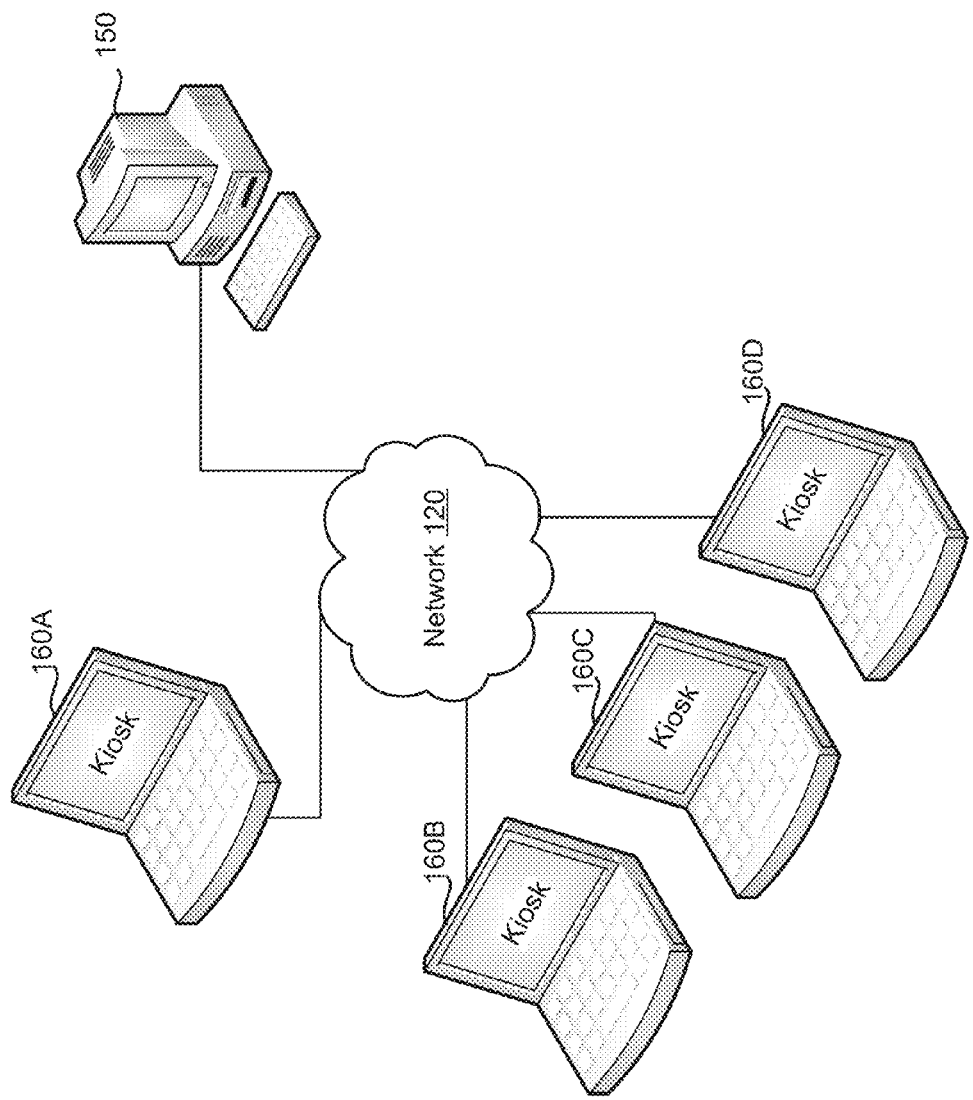
FIG. 1B is a block diagram of another system that can be used to provide a kiosk mode.

FIG. 1B illustrates a block diagram of another system that can be used to provide a kiosk mode. FIG. 1B includes the network 120 connecting a management console device 150 with various computers 160A, 160B, 160C, and 160D. The computers 160A, 160B, 160C, and 160D may be laptops or other computing devices and they may be distributed from each other or connected via an enterprise system, for example.

The management console device 150 may include a user interface to provide an enterprise administrator to manage the computers 160A, 160B, 160C, and 160D. Such a configuration, as shown in FIG. 1B, may allow for a fully managed experience, including fleet management for kiosk applications, auto-enrollment (i.e., zero touch enrollment), and pre-enrollment of kiosk devices. Over the air device repurposing may be used, for example, with a few video conferencing units. In one example, a large shareholder meeting may require terminals for voting. The meeting may be conducted using a videoconferencing application on computers 160A, 160B, 160C, and 160D. The administrator using the management console device 150 may push a new application ID to transform an entire fleet of devices for the meeting (e.g., computers 160A, 160B, 160C, and 160D) into a shareholder vote entry fleet using a simple voting application or website. After the vote, the administrator of the management console device 150 may push videoconferencing on the devices (e.g., computers 160A, 160B, 160C, and 160D) again to make them all videoconferencing units and to continue the meeting. After the meeting, the administrator of the management console device 150 may turn the devices back into regular workstations.

Figure 2:
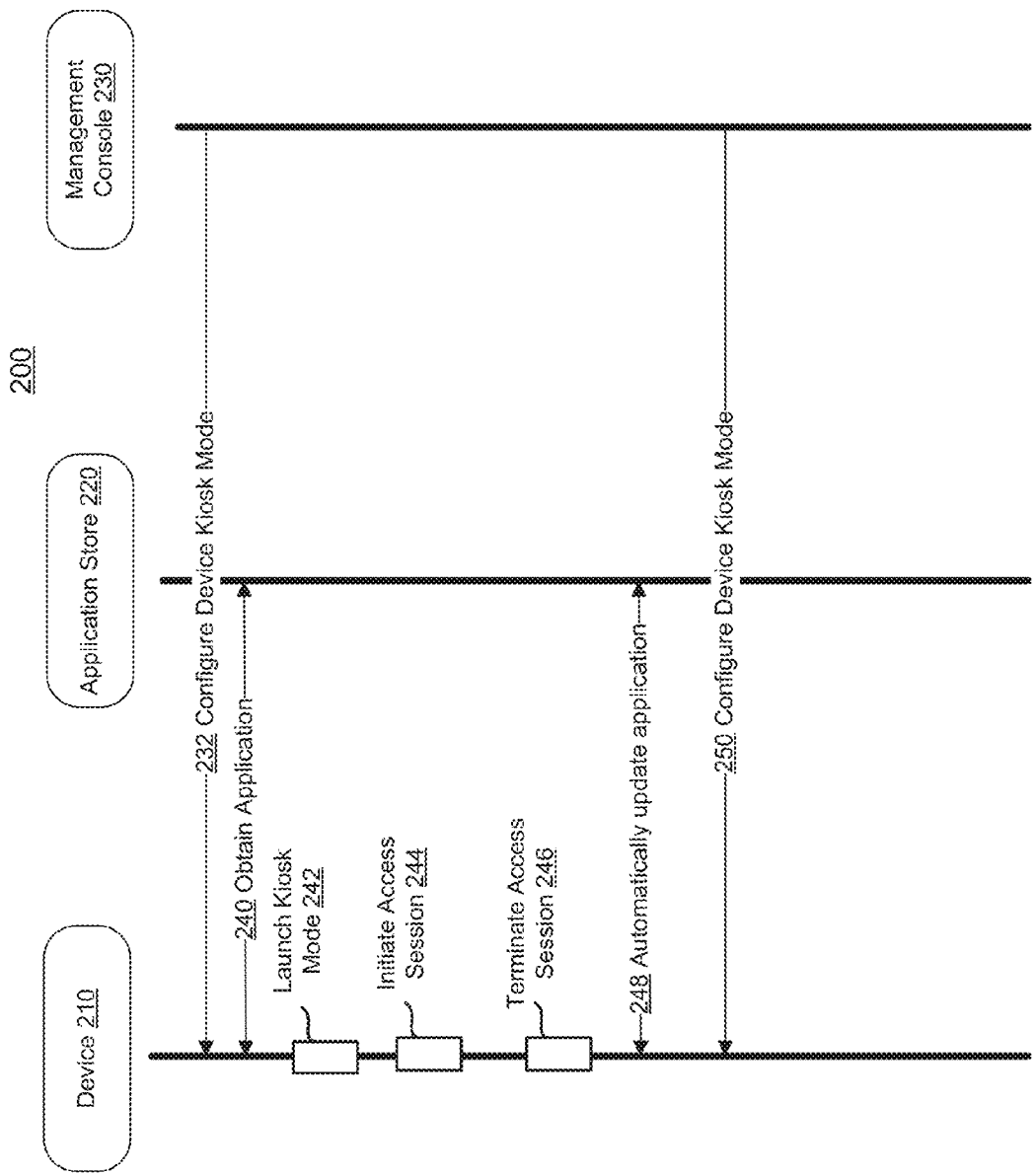
FIG. 2 is a sequence diagram illustrating an example of a system implementing kiosk mode.

FIG. 2 is a sequence diagram illustrating an example of a system 200 implementing a kiosk mode. The system 200 may include a device 210, an application store 220, and a management console 230. The device 210 may be a laptop or other computing device, such as device 110 shown in FIG. 1A, which may execute an operating system and one or more applications. The application store 120 may be an online web store or other digital media store.

In one example, an application such as a web application or packaged application may have been downloaded from a service or content provider web site or an online application store (such as application store 120).

In the illustrated embodiment, the black lines associated with each of the components of the system (e.g., device 210, application store 220) represent the execution, by at least one microprocessor, of a process associated with that component.

The management console 230 may be a user interface operated by at least one remote server or device.

Action 232 illustrates that, in one implementation, the management console 230 may remotely configure the device 210's kiosk mode. Such an configuration may include identifying and establishing an application to be installed or downloaded from application store 220 or from a service or content provider web site. In some implementations, the configuration may be made once, when the device 210 is initiated, and it will be understood that action 232 is an optional action.

The configuration may also include other management features, such as blocking a website or an application from access via the computer, configuring an input or output for the computer, establishing a timed log out for each session on the computer, or customizing the kiosk mode, such as adding a business logo or image to a start up or login screen of the kiosk mode.

Action 240 illustrates that the device 210 obtains (e.g., downloads or installs) the application from the application store 220. In some implementations, the application store may push the application to device 210 after receiving instructions to do so from the management console 230 (not shown) or after receiving a request from the device 210. The application may include a unique identification number and a kiosk flag in a manifest file of the application, the kiosk flag being set to true to indicate that the application is enabled to be operated in kiosk mode.

Action 242 illustrates that the device 210 launches kiosk mode. The device 210 may launch kiosk mode upon installing the application, upon being booted up or restarted, or upon receiving an input indicating a new session is being initiated by a user (e.g., upon receiving login credentials).

After launching the kiosk mode, action 244 illustrates that the device 210 initiates an access session. The access session may include, for example, allowing a user to use the application as a video conference, to place a menu order, airline or hotel check in, etc. Action 246 illustrates that the device 210 terminates the access session 246. This may be done in response to any number of signals, such as a timeout after a period of inactivity, a general timeout, a logout, or due to instructions from the management console 230 (not shown).

In some implementations, the application may crash. The operating system on the device 210 may monitor the state of the application. Upon detecting a crash, the operating system may automatically re-launch the application at the appropriate point.

Action 248 illustrates that the device 210 may automatically update the application without user input, for example by communicating with the application store, a service, or another website. In various implementations, action 248 may be performed on a continuing or periodic basis at any time, regardless of whether an access session is in progress. Action 250 illustrates that the management console 230 may configure the device kiosk mode again, as an option. For example, the management console 230 may configure the device kiosk mode various times, as described above with respect to FIG. 1B.

Figure 3:
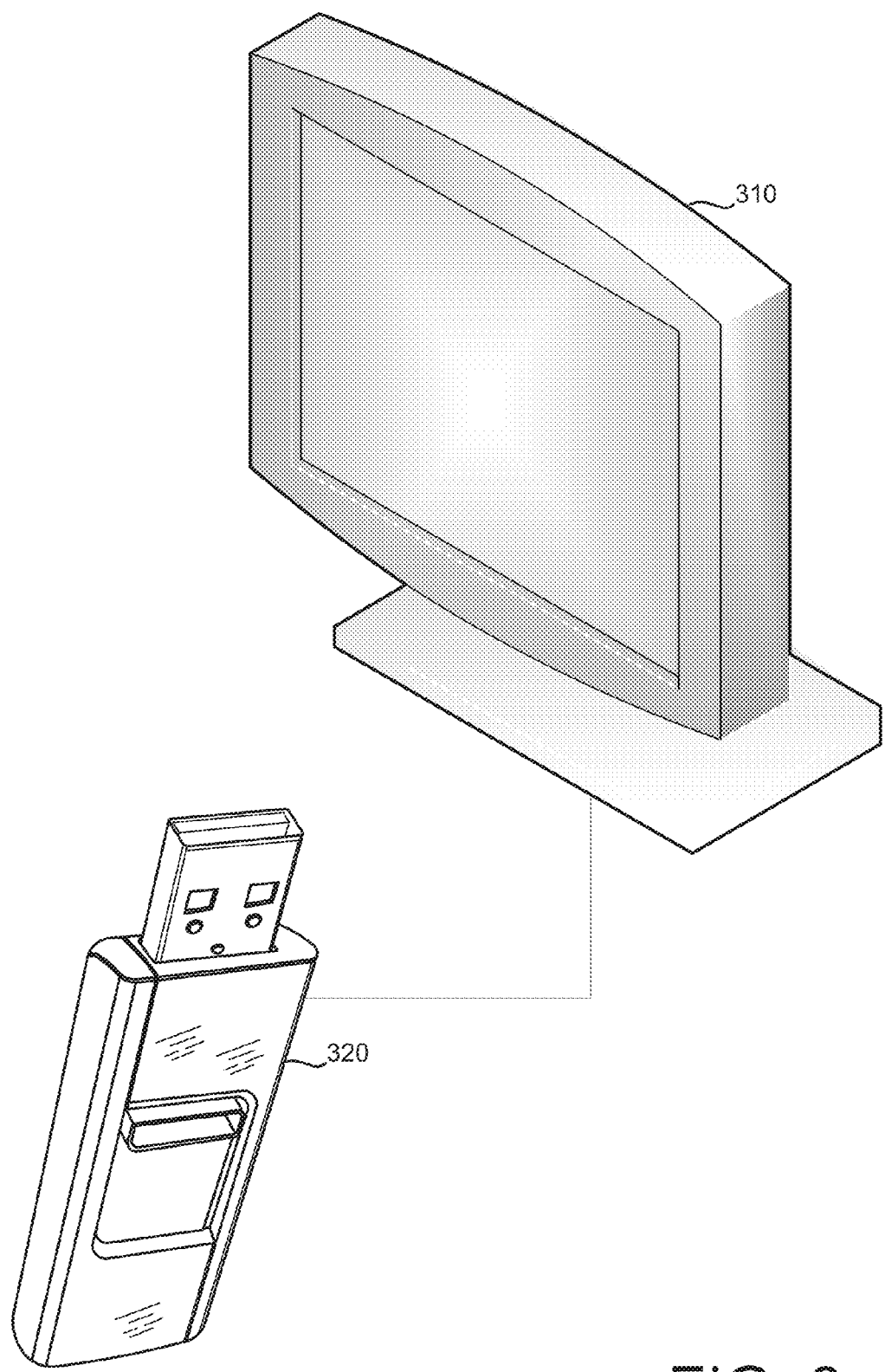
FIG. 3 is a block diagram of another example system for providing a kiosk mode.

FIG. 3 is a block diagram of another example system for providing a kiosk mode. FIG. 3 includes a monitor 310 and a hardware device 320. The monitor 310 may be part of a computer system or may be a separate wall mounted monitor that has a USB or HDMI input/output device. The hardware device 320 may be configured to include an operating system and a microprocessor that can execute applications such as web applications, which may be for example video conference applications. In some implementations, the hardware device 320 may be a USB memory stick configured with a special operating system. In some implementations, the hardware device 320 may be a camera/microphone dongle that can connect to the input/output device of the monitor 310. In one example, a user may plug in the hardware device 320 to the monitor 310 to launch a video conference session via the monitor. The hardware device 320 may automatically launch a kiosk mode, such as described above with respect to FIGS. 1A, 1B, and 2, and the kiosk mode may execute a video conference application via the monitor 310. The user may communicate with others via the camera/microphone. In some implementations, the monitor 310 may be equipped with a camera and microphone. In such implementations, the monitor 310 may serve as a "window" into another user's home or business with the user's permission such that two people can periodically conduct video conferencing without cumbersome setup processes.

Figure 4:
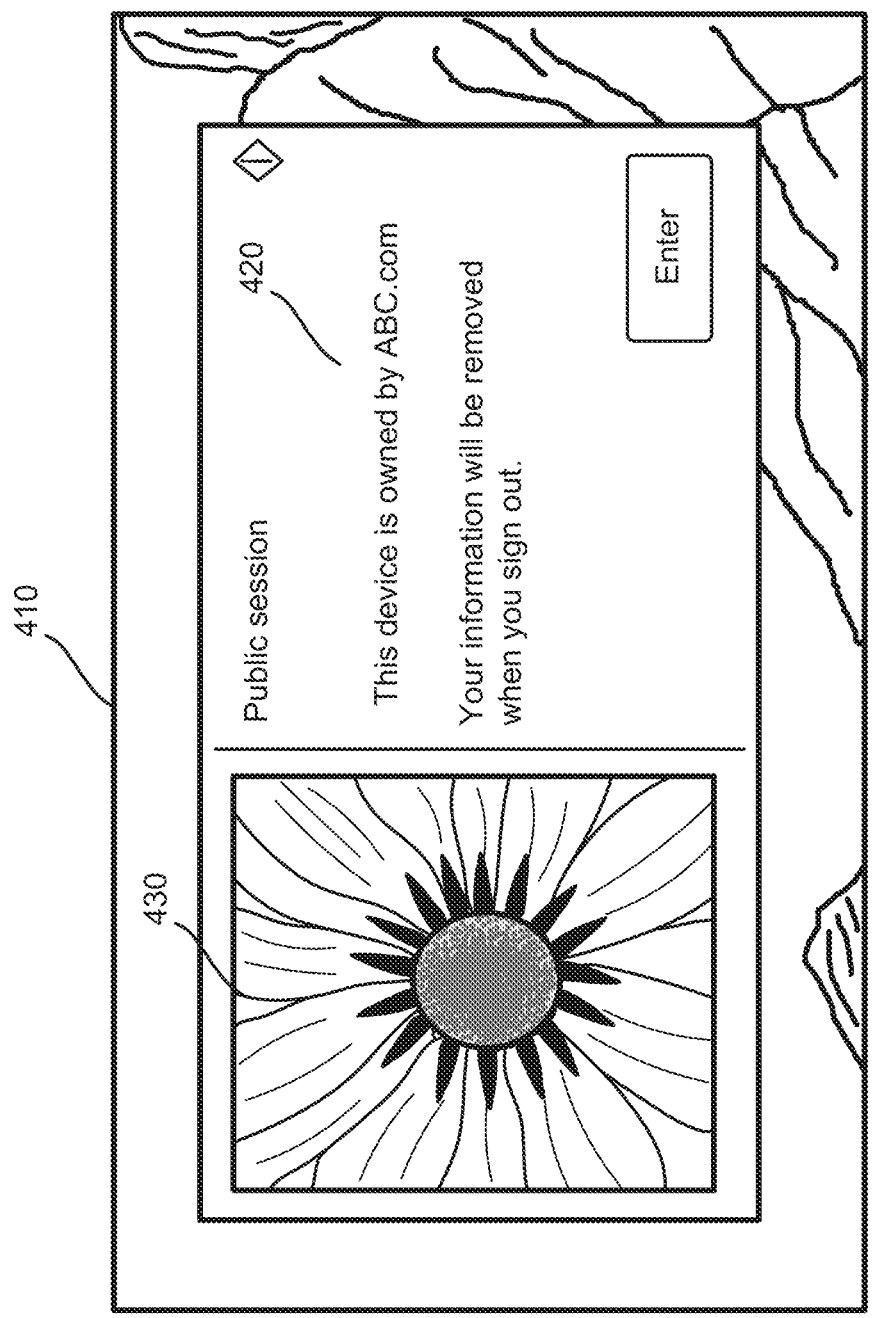
FIG. 4 is an example user interface that can be used with a kiosk mode.

FIG. 4 is an example user interface that can be used with a kiosk mode. The user interface may be displayed, for example, when a kiosk mode is launched such as in action 242 shown in FIG. 2, or when a device is launched an automatically launches into a kiosk mode. The user interface 410 may be customized, for example by an administrator using a management console (e.g., management console 230 shown in FIG. 2). For example, in some implementations the text 420 and an image 430 may be customized. In some implementations, (not shown), a user may be required to enter login credentials.

FIG. 5 is an example manifest file that can be used to provide a kiosk mode for a web application. The manifest file 510 may be included with a web application.

A web application may be a zipped file (such as a .CRX file) that includes metadata describing the web application. The metadata may, in some examples, contain a user interface (UI) element, and a manifest file. The UI element may include an image file, an HTML file, an icon such as a PNG file, or any other graphical user interface element. The manifest file may point to the UI element, and the manifest file may also include a name, description, version, URL(s), and permissions for the web application, among other data, such as a kiosk enabled mode flag. The manifest may include a URL that the web application uses, including a launch page for the web application. The manifest may be a .JSON or other file format.

In the implementation shown in FIG. 5, the manifest file 510 includes a name, version number, manifest version number, and kiosk enabled flag (Boolean value). As shown in FIG. 5, in the illustrated example, the name is "My KioskApp," the version is "1", the manifest version is "2", and the kiosk enabled flag is set to "true."

Figure 6:
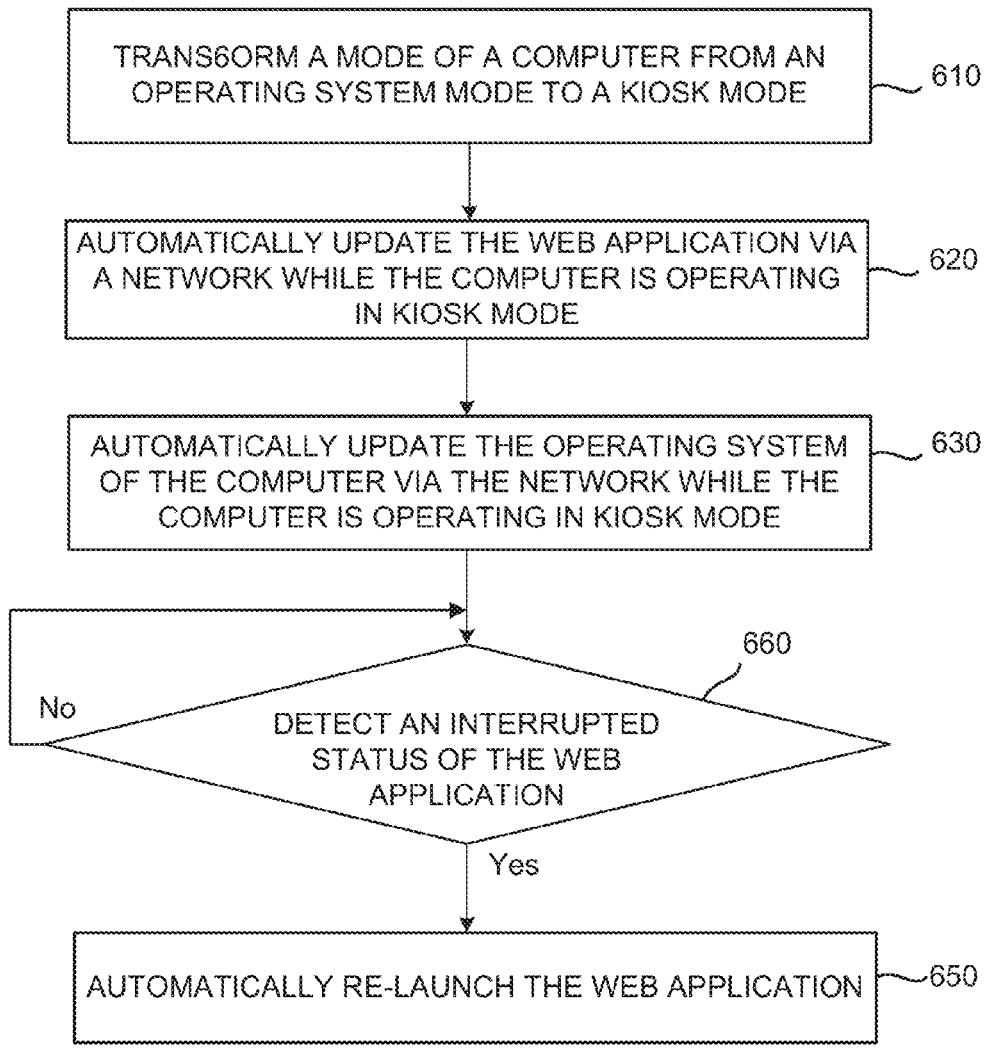
FIG. 6 is a flowchart of a process for providing kiosk mode.

FIG. 6 is a flowchart of a process for providing a kiosk mode. The process illustrated in FIG. 6 may be performed at least in part by a computing device, for example, the device 110 shown in FIG. 1A. As shown in FIG. 6, the device may transform a mode of a computer from an operating system mode to a kiosk mode (610). In some implementations, a remote device such as the management console shown in FIG. 2 may transform the operating system mode of the computer to a kiosk mode. In various implementations, a user of the computer may transform operating system mode of the computer to the kiosk mode.

The computer may automatically update the web application via a network while the computer is operating in kiosk mode (620). For example, the computer (e.g., via its operating system) may periodically query an application store to determine whether the application has any updates available for installation. Such a query may be done automatically, and without user input or the display of any user interface. The operating system may then push any updates to the application, again without user input, and in some implementations, without displaying any user interface or notification. The computer may also automatically update its operating system via a network while the computer is operating in kiosk mode (630). Such updating may be performed on a periodic basis by the operating system, or in response to the operating system receiving a pushed update from a remote server.

The computer may monitor the state of the application while in kiosk mode, and the computer may thus detect an interrupted status of the web application (640), for example if the web application crashes unexpectedly while in a session. If the computer detects an interrupted status of the web application (640, yes), the computer may automatically re-launch the web application, for example using the operating system to automatically re-boot the computer and launch in the kiosk mode such that the application is executing at the same point where it was before it crashed. Such automatic re-launching may be performed by the operating system without requiring user input.

In some implementations, the process shown in FIG. 6 may begin again whenever the device is turned on or whenever a management console accesses the device for reconfiguration. In addition, the logic flow depicted in FIG. 6 does not require the particular order shown, or sequential order, and steps may be added or deleted.

Figure 7:
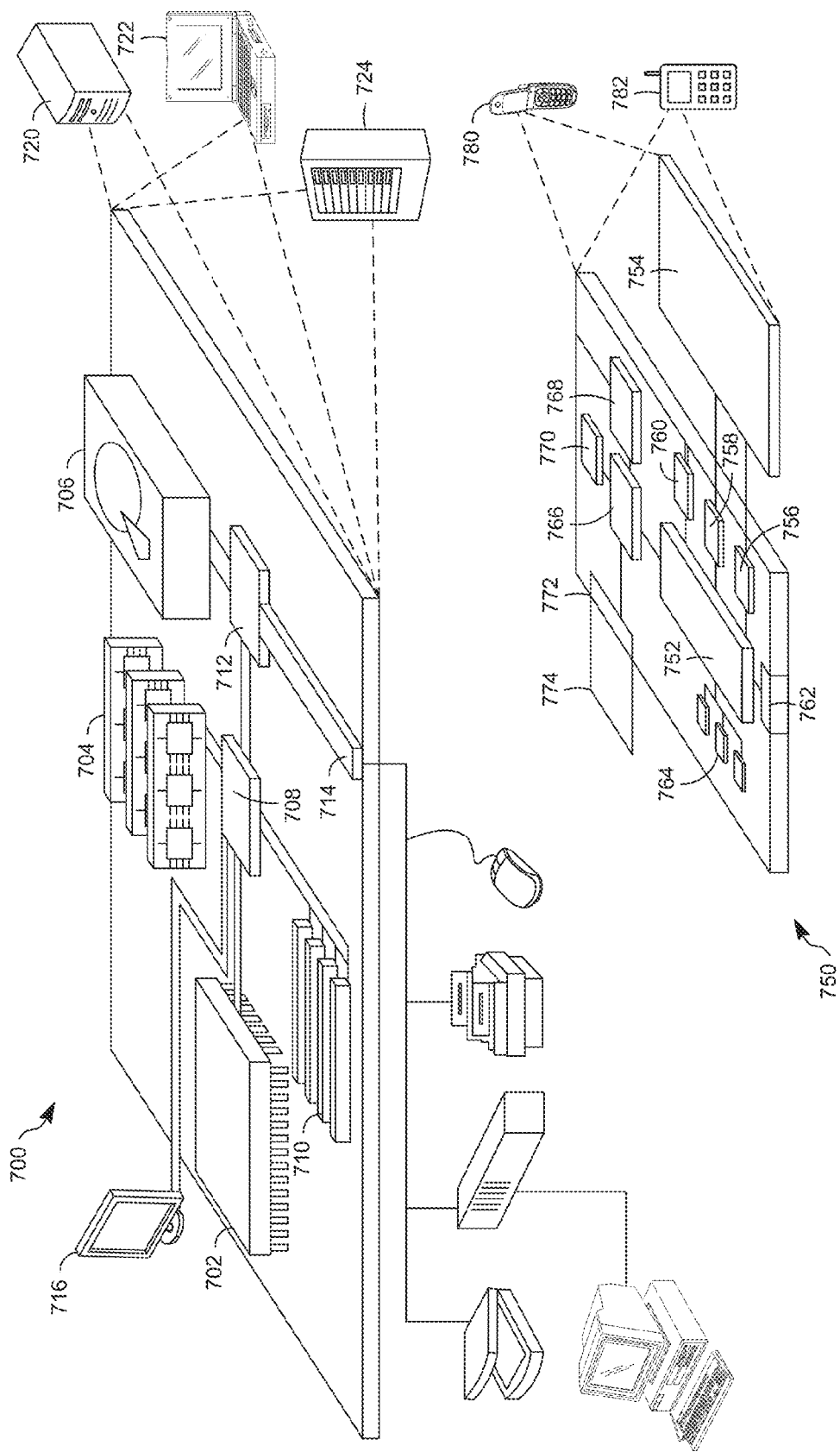
FIG. 7 illustrates an example of a computing device and a mobile computing device that can be used to implement the techniques described here.

FIG. 7 illustrates an example of a computing device and a mobile computing device that can be used to implement the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. In some implementations, the memory includes a combination of volatile and non-volatile memory units, for example as described above with respect to FIG. 3. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is illustrative only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion bus 714. The low-speed expansion bus, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a BLUETOOTH, WIFI, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method comprising:
   transforming a mode of a computer from an operating system mode to a kiosk mode, wherein the kiosk mode provides a user interface for one web application, and wherein the kiosk mode prevents access to any other application and prevents access to an operating system of the computer;
   receiving the web application from a management console of a second computer;
   automatically updating the web application to an updated version of the web application via a network while the computer is operating in kiosk mode;
   automatically updating the operating system of the computer via the network while the computer is operating in kiosk mode;
   automatically re-launching, via the computer, the web application in response to detecting an interrupted status of the web application into a state of the web application at a time of the interrupted status while the computer is operating in kiosk mode;
   receiving a second web application from the management console of the second computer to replace the one web application running in the kiosk mode; and
   running only the second web application in the kiosk mode.

2. The method of claim 1, further comprising:
   initiating a session of the kiosk mode upon receiving an input from a user;
   after initiating a session of the kiosk mode, receiving data from the user during the session; and
   automatically removing the data after an end point of the session.

3. The method of claim 2, wherein the input from the user includes login credentials.

4. The method of claim 1, wherein the web application includes a manifest file and an HTML file.

5. The method of claim 1, further comprising:
   upon booting up the computer, automatically launching the computer in the kiosk mode.

6. The method of claim 1, further comprising:
   remotely controlling the kiosk mode of the computer from the management console of the second computer.

7. The method of claim 6, wherein the remotely controlling includes:
   establishing the web application that launches when a user accesses the computer.

8. The method of claim 6, wherein the remotely controlling includes:
   blocking a website or an application from access via the computer.

9. The method of claim 6, wherein the remotely controlling includes:
   configuring an input for the computer and an output for the computer.

10. The method of claim 6, wherein the remotely controlling includes:
    establishing a timed log out for each session on the computer.

11. The method of claim 6, wherein the remotely controlling includes:
    customizing the web application.

12. The method of claim 1, wherein web application is one of a video conference application, a business check-in application, a digital catalog application, or an ordering application.

13. A method comprising:
configuring, via an enterprise policy control panel of a first computer, an operating system mode of a second computer to a kiosk mode, wherein the kiosk mode provides a user interface for one web application, and wherein the kiosk mode prevents access to any other application and prevents access to the operating system of the computer;
automatically updating, by the second computer, the web application to an updated version of the web application via a network while the second computer is operating in kiosk mode;
automatically updating, by the second computer, the operating system of the second computer via the network while the second computer is operating in kiosk mode;
automatically re-launching, via the second computer, the web application in response to detecting an interrupted status of the web application into a state of the web application at a time of the interrupted status while the second computer is operating in kiosk mode;
receiving a second web application from the first computer to replace the one web application running in the kiosk mode; and
running only the second web application in the kiosk mode.

14. The method of claim 13, further comprising:
establishing, via the enterprise policy control panel, the web application that launches when a user accesses the second computer.

15. The method of claim 13, further comprising:
blocking, via the enterprise policy control panel, a website or an application from access via the second computer.

16. The method of claim 13, further comprising:
establishing, via the enterprise policy control panel, a timed log out for each session on the second computer.

17. The method of claim 13, further comprising:
customizing, via the enterprise policy control panel, the kiosk mode.

18. A computing device, comprising:
at least one non-transitory computer-readable storage device storing instructions;
at least one processor coupled to the at least one non-transitory computer-readable storage device, the at least one processor being configured to execute the stored instructions that, when executed, cause the computing device to:
transform a mode of the computing device from an operating system mode to a kiosk mode, wherein the kiosk mode provides a user interface for one web application, and wherein the kiosk mode prevents access to any other application and prevents access to an operating system of the computer;
receive the web application from a management console of a second computing device;
automatically update the web application to an updated version of the web application via a network while the computing device is operating in kiosk mode;
automatically update the operating system of the computer via the network while the computing device is operating in kiosk mode;
automatically re-launch the web application in response to detecting an interrupted status of the web application into a state of the web application at a time of the interrupted status while the computing device is operating in kiosk mode;
receive a second web application from the management console of the second computing device to replace the one web application running in the kiosk mode; and
running only the second web application in the kiosk mode.

19. The computing device of claim 18, wherein the at least one processor is further configured to execute the stored instructions that, when executed, cause the computing device to:
initiate a session of the kiosk mode upon receiving an input from a user;
after initiating a session of the kiosk mode, receive data from the user during the session; and
automatically remove the data after an end point of the session.

20. The computing device of claim 18, wherein the at least one processor is further configured to execute the stored instructions that, when executed, cause the computing device to:
receive instructions from the management console of the second computing device wherein the received instructions remotely control the kiosk mode of the computing device.

* * * * *